United States Patent
Lilley (10) Patent No.: US 10,387,777 B2
(45) Date of Patent: Aug. 20, 2019

(54) ITERATIVE FEATURE SELECTION METHODS

(71) Applicant: Liquid Biosciences, Inc., Aliso Viejo, CA (US)

(72) Inventor: Patrick Lilley, Aliso Viejo, CA (US)

(73) Assignee: LIQUID BIOSCIENCES, INC., Aliso Viejo, CA (US)

( * ) Notice: Subject to any disclaimer, the term of this patent is extended or adjusted under 35 U.S.C. 154(b) by 0 days.

(21) Appl. No.: 15/636,394

(22) Filed: Jun. 28, 2017

(65) Prior Publication Data
US 2019/0180181 A1    Jun. 13, 2019

(51) Int. Cl.
*G06N 3/08* (2006.01)

(52) U.S. Cl.
CPC ............. *G06N 3/082* (2013.01); *G06N 3/086* (2013.01)

(58) Field of Classification Search
CPC ...... G06N 3/082; G06N 3/086; G06N 99/005; G06N 3/126; G06F 19/24; G06F 17/00; G09B 7/00; E21B 43/16; G06Q 10/00
See application file for complete search history.

(56) References Cited

U.S. PATENT DOCUMENTS

| | | | |
|---|---|---|---|
| 5,963,902 A | 10/1999 | Wang | |
| 6,941,287 B1 * | 9/2005 | Vaidyanathan | G06K 9/6229 706/12 |
| 9,471,881 B2 * | 10/2016 | Haws | G06N 99/005 |
| 2002/0127529 A1 | 9/2002 | Cassuto et al. | |
| 2011/0071956 A1 | 3/2011 | Pinto et al. | |
| 2014/0289172 A1 * | 9/2014 | Rothman | G06N 5/04 706/11 |

FOREIGN PATENT DOCUMENTS

| | | |
|---|---|---|
| WO | 2004053659 A2 | 6/2004 |
| WO | 2009032220 A1 | 3/2009 |

OTHER PUBLICATIONS

International Search Report and Written Opinion, PCT/US2017/039812, dated Dec. 26, 2017.

* cited by examiner

*Primary Examiner* — Kamran Afshar
*Assistant Examiner* — Ying Yu Chen
(74) *Attorney, Agent, or Firm* — Entralta P.C.; Justin G. Sanders; Peter D. Weinstein (57) ABSTRACT

Feature selection methods and processes that facilitate reduction of model components available for iterative modeling. It has been discovered that methods of eliminating model components that do not meaningfully contribute to a solution can be preliminarily discovered and discarded, thereby dramatically decreasing computational requirements in iterative programming techniques. This development unlocks the ability of iterative modeling to be used to solve complex problems that, in the past, would have required computation time on orders of magnitude too great to be useful.

18 Claims, 6 Drawing Sheets

ITERATIVE FEATURE SELECTION METHODS

FIELD OF THE INVENTION

The field of the invention is iterative feature selection.

BACKGROUND

The background description includes information that may be useful in understanding the present invention. It is not an admission that any of the information provided in this application is prior art or relevant to the presently claimed invention, or that any publication specifically or implicitly referenced is prior art.

As data becomes more available and as the size of datasets increase, many analytical processes suffer from the "curse of dimensionality". The phrase "curse of dimensionality," which was coined by Richard E. Bellman ("Adaptive control processes: a guided tour;" 1961; Princeton University Press), refers to the problems that arise when analyzing and organizing data in hyper-dimensional spaces (e.g. datasets with hundreds, thousands, or millions of features or variables) that do not occur in low-dimensional settings.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

Although computer technology continues to advance, processing and analyzing hyper-dimensional datasets is computationally intensive. For example, with iterative modeling processes the computation time required to search all possible model component combinations increases exponentially with each addition of an additional model component. In particular, there is a need to reduce computational requirements in hyper-dimensional spaces in a way that makes techniques such as iterative modeling processes more appropriate for solving complex problems using large datasets. One way to reduce computational requirements in iterative modeling processes is to reduce the universe of algorithm components available to the modeling process.

It has yet to be appreciated that the number of algorithm components available to an iterative modeling process can be dramatically reduced by determining which components are and are not significant to a solution.

Thus, there is still a need in the art for iterative feature selection methods as applied to iterative modeling processes.

SUMMARY OF THE INVENTION

The present invention provides apparatus, systems, and methods in which model components are eliminated as possible model components for the development of models in iterative modeling processes.

In one aspect of the inventive subject matter, a method of decreasing computation time required to improve models that relate predictors and outcomes in a dataset is contemplated. The method includes several steps. First, models are generated using model components from pools of model components. Using a subset of the dataset, model-attribute metrics (e.g., accuracy, sensitivity, specificity, area under curve (AUC) from a receiver operating characteristic (ROC) metric, and algorithm length) are generated for each model. Next, utility metrics are computed for some model components, where a utility metric is a ratio of (1) a quantity of models in which each model component is present, to (2) a quantity of model component pools in which each model component is present. Weighted utility metrics that correspond model components can then be computed.

Weighted utility metrics, in some embodiments, are an outcome of a function involving (1) model-attribute metrics for models in which model components are present and (2) utility metrics for those model components. Based on the weighted utility metrics, certain model components from the pools of model components are eliminated or retained. In some embodiments, the function includes a product of a model-attribute metric and a utility metric.

In some embodiments, model components are randomly generated. Model components can be, among other things, computational operators, mathematical operators, constants, predictors, features, variables, ternary operators, algorithms, formulas, binary operators, weights, gradients, nodes, or hyper-parameters.

It should be appreciated that the disclosed subject matter provides advantageous technical effects including improved operation of a computer by dramatically decreasing computational cycles required to perform certain tasks (e.g., genetic programming). In the absence of the inventive subject matter, iterative modeling methods do not provide tenable solutions in many situations due in large part to their steep computational requirements that would necessitate sometimes months and years of computing time.

Various objects, features, aspects and advantages of the inventive subject matter will become more apparent from the following detailed description of preferred embodiments, along with the accompanying drawing figures in which like numerals represent like components.

DETAILED DESCRIPTION

The following discussion provides example embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

As used in the description in this application and throughout the claims that follow, the meaning of "a," "an," and "the" includes plural reference unless the context clearly dictates otherwise. Also, as used in the description in this application, the meaning of "in" includes "in" and "on" unless the context clearly dictates otherwise.

Also, as used in this application, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements. Moreover, and unless the context dictates the contrary, all ranges set forth in this application should be interpreted as being inclusive of their endpoints and open-ended ranges should be interpreted to include only commercially practical values. Similarly, all lists of values should be considered as inclusive of intermediate values unless the context indicates the contrary.

It should be noted that any language directed to a computer should be read to include any suitable combination of computing devices, including servers, interfaces, systems, databases, agents, peers, Engines, controllers, or other types of computing devices operating individually or collectively. One should appreciate the computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclosed apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network. The following description includes information that may be useful in understanding the present invention. It is not an admission that any of the information provided in this application is prior art or relevant to the presently claimed invention, or that any publication specifically or implicitly referenced is prior art.

As used in this application, terms like "set" or "subset" are meant to be interpreted to include one or more items. It is not a requirement that a "set" include more than one item unless otherwise noted.

One purpose of the inventive subject matter is to identify and eliminate low performing (e.g., unnecessary or unneeded) model components that are used to create models that describe relationships between predictors and outcomes in target datasets. Pruning the number of possible model components improves computational efficiency by decreasing computation time required to converge on high performing models in an iterative modeling process.

There are several phases to the inventive subject matter, and these phases can be implemented as method steps.

Figure 1:
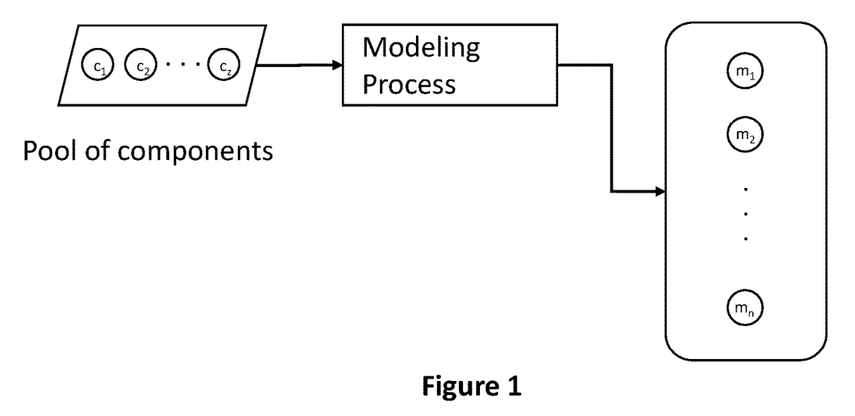
FIG. 1 shows a general framework for an iterative modeling process.

In one contemplated embodiment of the inventive subject matter, the first phase is to use an iterative modeling process generate a set of models from a pool of model components. FIG. 1 illustrates a general iterative modeling framework, where model components in the set $\{c_1, \ldots, c_z\}$ are subjected to a modeling process to generate models $m_1$ through $m_n$.

As used herein, the term "iterative modeling process" refers to a modeling method for creating one or more models to describe the relationship between predictors and outcomes in target datasets that includes a repeatable or loop-able subroutine or process (e.g. a run, a for loop, an epoch, a cycle).

Contemplated iterative modeling processes include deep learning methods such as Artificial Neural Networks (ANNs), Convolutional Neural Networks (CNNs), Recursive Neural Networks, Deep Boltzmann Machines (DBMs), Deep Belief Networks (DBNs), Stacked Auto-Encoders, and other modeling techniques derived from a neural network framework.

Additionally, or alternatively, contemplated iterative modeling processes include evolutionary programming methods, including genetic algorithms and genetic programming (e.g., tree-based genetic programming, stack-based genetic programming, linear (including machine code) genetic programming, grammatical evolution, extended compact genetic programming (ECGP), embedded Cartesian genetic programming (ECGP), probabilistic incremental program evolution (PIPE), and strongly typed genetic programming (STGP)). Other evolutionary programming methods include gene expression programming, evolution strategy, differential evolution, neuroevolution, learning classifier systems, or reinforcement learning systems, where solution is a set of classifiers (rules or conditions) that can be binary, real, neural net, or S-expression types. In the case of learning classifier systems, fitness may be determined with either a strength or accuracy based reinforcement learning or supervised learning approach.

Additional or alternative contemplated iterative modeling processes may include Monte Carlo methods, Markov chains, stepwise linear and logistical regression, decision trees, Random Forests, Support Vector Machines, Bayesian modeling techniques, or Gradient-Boosting techniques, so long as the process includes a repeatable or loop-able subroutine or process (e.g. a run, a for loop, an epoch, a cycle).

In a next phase, utility metrics are calculated for select model components, and model-attribute metrics are calculated for select models. A weighted utility metric is then calculated using each utility metric and one or more model-attribute metrics. Based on the weighted utility metrics, some model components are eliminated from model component pools while others are allowed to remain. This pruning process improves a computer's ability to carry out iterative modeling methods by decreasing the dimensionality of the search space by decreasing the number of model components, and is described in more detail below.

Figure 2:
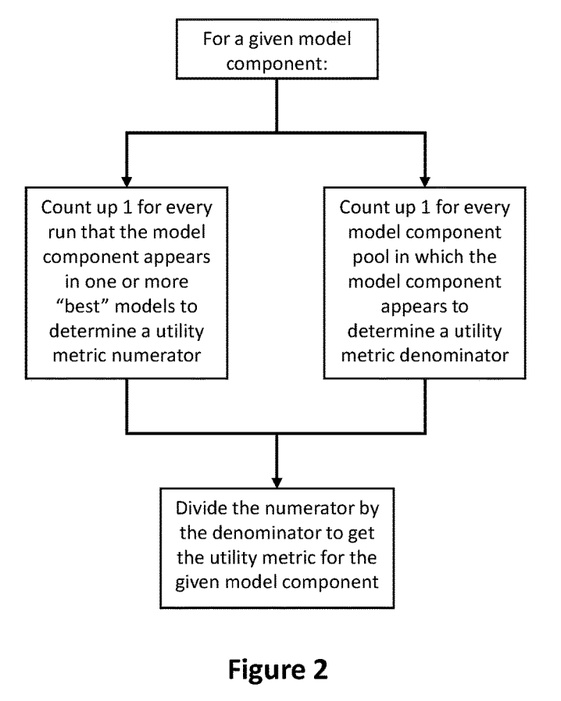
FIG. 2 shows a contemplated method for determining a model component utility metric.

In some embodiments, each model component has a utility metric computed for it. A utility metric, one embodiment of which is demonstrated in FIG. 2, is a ratio where the numerator of the ratio is a count of times that a model component appears in a model, and the denominator is a count of times that a model component appears in a model component pool.

In some contemplated embodiments, model components can include, for example: computational operators (e.g., logical statements like IF, AND, OR), mathematical operators (e.g., arithmetic operations like multiplication, division, subtraction, and addition; trigonometric operations; logistic functions; calculus operations; "floor" or "ceiling" operators; or any other mathematical operators), constants (e.g., a constant numerical value, including integers or values like pi), a predictor (e.g., observed or measured values or formulas), features (e.g., characteristics), variables, ternary operators (e.g., an operator that takes three arguments where the first argument is a comparison argument, the second is the result upon a true comparison, and the third is the result upon a false comparison), algorithms, formulas, literals, functions (e.g., unary functions, binary functions, etc.), binary operators (e.g., an operator that operates on two operands and manipulates them to return a result), weights and weight vectors, nodes and hidden nodes, gradient descent, sigmoidal activation functions, hyper-parameters, and biases.

Figure 3:
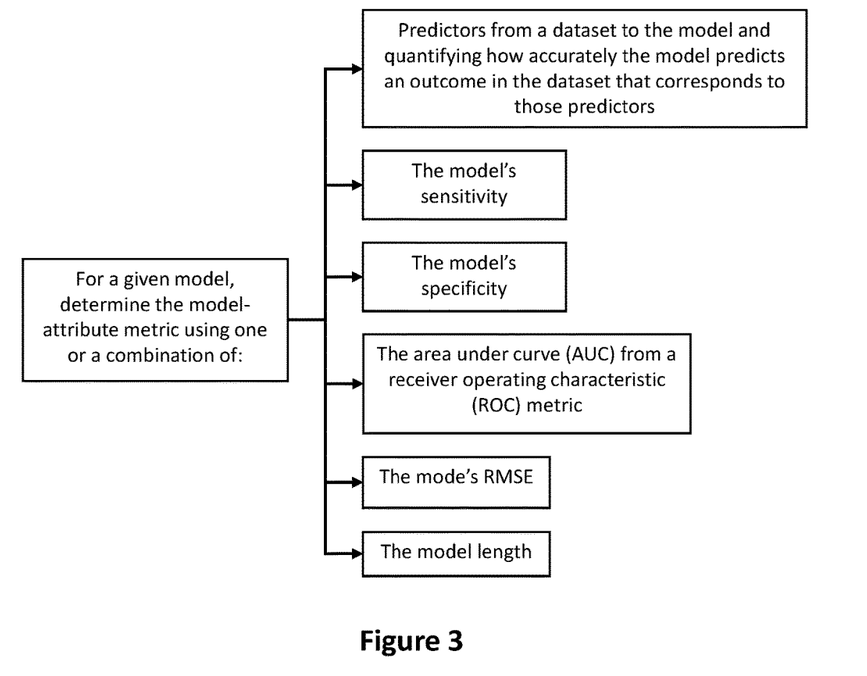
FIG. 3 shows a contemplated method for determining a model-attribute metric.

FIG. 3 shows how a model-attribute metric can be determined. It is contemplated that in some contemplated embodiments, a model-attribute metric can describe the ability of a model to use predictors to predict an outcome, where its accuracy is expressed as a percent. Data from a dataset is used to determine the model-attribute metric, where the dataset includes predictors and outcomes and model-attributes are determined by giving a model only the predictors and then comparing the outcome from the model to the actual outcome from the dataset. For example, if a model uses a set of predictors to accurately predict an outcome 35% of the time, then a model-attribute metric for that model is 35%.

In other embodiments, the model-attribute metric can additionally or alternatively be sensitivity, specificity, area under curve (AUC) from a receiver operating characteristic (ROC) metric, root-mean-square error (RMSE), algorithm length, algorithm computation time, variables or components used, or other suitable model attributes. The model-attribute metric can be determined using one or more of the identified model attributes, though it is contemplated that the model-attribute metric is not restricted to only these attributes.

Figure 4:
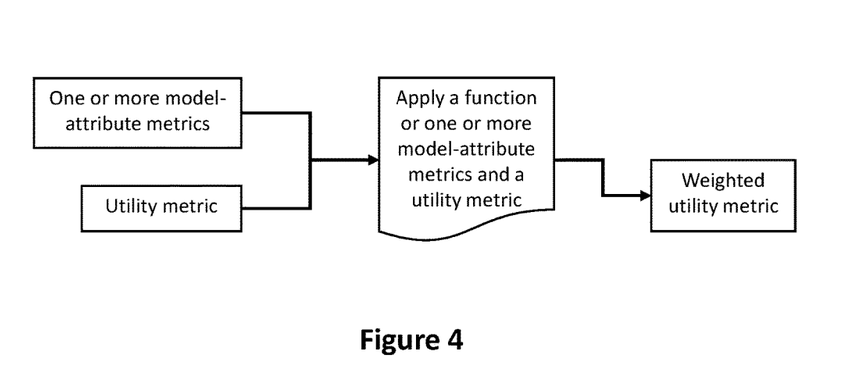
FIG. 4 shows a contemplated method for calculating a weighted utility metric.

To determine whether a model component is sufficiently able to contribute to model performance (e.g., whether a particular model component has an effect on the ability of a model to determine an outcome using a set of predictors), a weighted utility metric is created as a function of each utility metric is and one or more model-attribute metrics, as shown in FIG. 4.

It is contemplated that whether a model component is "important" or "unimportant" is determined by whether or not the weighted utility metric falls below or above a threshold. In some embodiments, the threshold can be calculated by first averaging all of the weighted utility metrics for the model components appearing in the set of models (e.g., $\{m_1, \ldots, m_n\}$ in FIG. 1). Then, each individual weighted utility metric is divided by a summary statistic for all weighted utility metrics (e.g. an average, a tri-mean, a variance, a standard deviation, a mode, a median).

Figure 5:
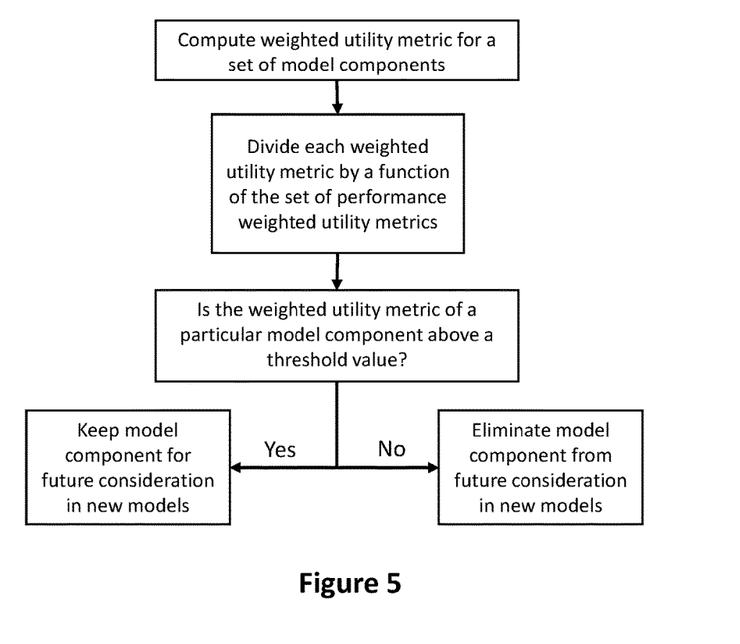
FIG. 5 shows a contemplated method for eliminating or retaining a given model component from a pool of model components.

If the result of dividing a weighted utility metric by the summary statistic of all weighted utility metrics is below a certain threshold (e.g., the result is less than 1.2, 1.1, 1, 0.9, 0.8, 0.7, 0.6, 0.5, or 0.4), the model component corresponding to that weighted utility metric is eliminated from consideration (e.g., that model component cannot be put into any new model component pools that are used to generate new sets of runs). This process is shown in FIG. 5.

Other suitable methods of determining whether to keep or eliminate model components are also contemplated. For example, in some embodiments, weighted utility metrics are compared to a threshold value without undergoing any manipulation prior to comparison (e.g., the process of averaging, dividing, and comparing, or any of the other processes discussed above). The threshold value can be arbitrary, or selected based on an understanding of expected weighted utility metric values. In these embodiments, upon computing a weighted utility metric for a model component, that weighted utility metric is then compared to a predefined threshold, and, based on that comparison, the model component corresponding to that weighted utility metric is either eliminated from all model component pools (e.g., the weighted utility metric fell below the threshold value) or allowed to remain for use in future runs.

Ultimately, it is contemplated that some number of model components are found to be less useful than others based on their corresponding weighted utility metrics, and when that lack of utility falls below a threshold, those model components are discarded.

In some embodiments, after eliminating model components from consideration, new pools of model components are generated without the eliminated model components. In other embodiments, model components are eliminated from the existing model pools, and those same model pools are again used to generate sets of models for a new set of runs. In still further embodiments, model components are merely taking out of consideration without eliminating them from model component pools. From this point forward, the process can repeat, ultimately resulting in eliminating more model components. The process can be repeated as needed until the remaining model components are all found to contribute meaningfully to the "best" models in each iteration or run.

Through this process, model components are pruned from one or more pools of model components. By pruning model components according to the inventive subject matter, computation time required to perform iterative modeling (and related tasks) is dramatically reduced.

Without wishing to be limited to one particular-type of iterative modeling, a subset of embodiments of the inventive subject matter provides for apparatus, systems, and methods in which model components are eliminated as possible model components for the development of models in genetic programming processes. An illustration of the application of the inventive subject matter to genetic programming is useful for understanding the application to other iterative modeling techniques.

For example, in this subset of contemplated embodiments, the first phase is to use a genetic programming process to generate a set of models that that make up a "run." The term "run" describes a set of models that are manipulated to converge on a "best" model. Within a run, a set of models is generated using model components from a pool of model components.

This set of models is called a generation of models. In the next phase, the models in the first generation (which are randomly generated) are made to compete to determine which model or models in that generation performs the best, and then a subsequent generation of models are generated, in part, using (e.g., based on or by duplicating) models from the previous generation. These phases are iteratively completed across multiple generations within each run until one or more models are developed that adequately describe a relationship between predictors and outcomes in a dataset.

In a next phase, utility metrics are calculated for selected model components, and model-attribute metrics are calculated for select models for each run.

Figure 6:
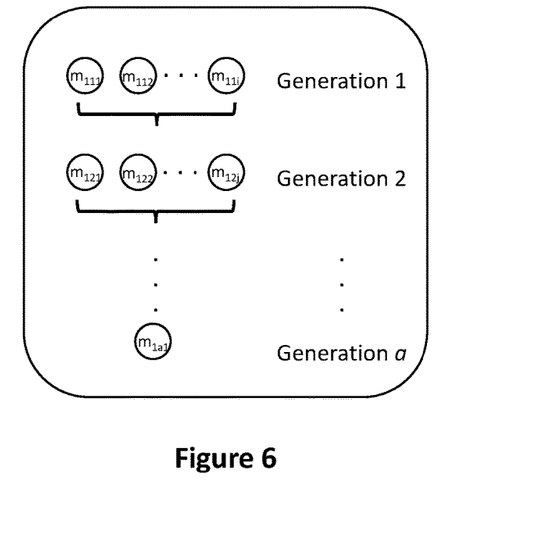
FIG. 6 shows one contemplated embodiment comprising a run having models, a series of generations, and a "best" model.

The first generation of a run requires generation of a set of models. Models of the inventive subject matter are described using the notation $m_{abc}$ where a is the run number, b is the generation number, and c is the model number. FIG. 6 shows a run having a run number of 1, and it shows a first generation composed of models $m_{111}$ through $m_{11i}$. The value of i is the number of models in that generation. It is contemplated that i can be between 10 and 1,000,000, or more preferably between 100 and 10,000, and most preferably between 1,000 and 5,000.

Figure 7:
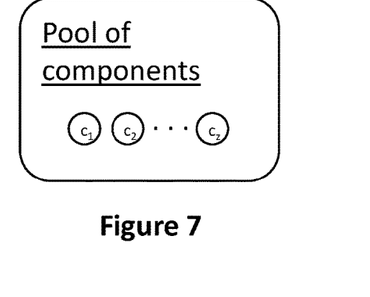
FIG. 7 shows a pool of model components corresponding to the run in the FIG. 6.

Models $m_{111}$ through $m_{11i}$ are generated randomly using a variety of model components from a model component pool, as shown in FIG. 7. It is contemplated that a model is an algorithm and model components are used to make up the algorithm. Model components in FIG. 7 are expressed as the set $\{c_1, \ldots, c_z\}$. While all model components in the pool are available for use in models corresponding to that model pool, not all model components must be used. Additionally, if a model component is used in a model, that model component remains available for use in other models.

As described elsewhere, to determine whether a particular model component has an effect on the ability of a model to determine an outcome using a set of predictors), a weighted utility metric is created as a function of each utility metric and one or more model-attributes, as shown in FIG. 4.

In one aspect of the inventive subject matter, a first generation of models $\{m_{111}, \ldots, m_{11i}\}$ is generated, and the models in that first generation are made to compete with each other to determine which of the models performs the best. A competition, for example, can be a comparison of model performances (e.g., the ability of a model to predict an outcome from a set of predictors). In some embodiments, after the models in each generation of a run compete with each other, a set of best performing models is identified. In other embodiments, a single best performing model is identified. It is contemplated that a top percent of models based on performance can be considered the best performing in each generation (e.g., a top 1-5%, 5-10%, 10-20%, 20-30%, 30-40%, or 40-50%).

A best performing model can be described in several ways. For example, if a model uses predictors to predictor an outcome some percent of the time (e.g., by using predictor data from a dataset where the outcome is already known and comparing the result of the model with the actual outcome from the dataset), that percent can be used to determine whether that model is a model performs better than other models in a generation. In such embodiments, models in a generation would "compete" against each other in a way that the models with the higher percent accuracies at determining outcomes from predictors would "defeat" models having lower percent accuracies. Once some (or all but one) of the models in a generation have been eliminated (e.g., defeated models are removed from the set), the best models (or model) remain.

In another example, a "best" model of a generation can be one that has one or more favorable characteristics when compared to other models in the generation. For example, a "best" model could be one that is the "shortest" in terms of algorithm length (e.g., the model uses the fewest model components either in terms of quantity, type, or non-overlapping model components), lowest computation time required to execute the model, best training accuracy, best standard process training validation, or best training validation. Additionally, the "best" model may be determined by a combination of these and any other factors discussed in this application.

With one or more models from the first generation in a run identified as being the best performers, the second generation of models can be generated. The second generation of models can be composed of several subsets of models. For example, a subset of models in a subsequent generation can be randomly generated using model components from the model pool (shown in FIG. 7), while another subset of models can be generated by mutation of models from a previous generation (e.g., the best model or models), and another subset can be generated by creating offspring (also referred to as crossover) using models from a previous generation (e.g., the best model or models from a previous generation).

In some embodiments, a subset of models from one generation are included in a subsequent generation (e.g., any subsequent generation) without alteration. For example, one or more of the models from a prior generation (e.g., the "best" model or models) can be introduced into any subsequent generation in an effort to reduce the time required to converge on a "best" model for the run (the concept of a "best" model for a run is described more fully below). Thus, once generation a is reached in, for example, FIG. 6, any of models from generations 1 through a−1 could be included in generation a.

It is additionally contemplated that bringing models (e.g., "best" models) from one generation into a subsequent generation unaltered can be flagged to occur only after some number of generations has been iterated through (e.g., 10-100 generations, 100-150 generations, 150-250 generations). For example, in some embodiments, "best" models from any of the previous generations can be incorporated into the $100^{th}$ generation. In other embodiments, if the run is flagged so that "best" models from a generation can only begin to carry over after the $100^{th}$ generation, then on the $101^{st}$ generation, the "best" model(s) from the $100^{th}$ generation can be incorporated. In these embodiments, after the $100^{th}$'s generation, models from any previous generation from 100 and on can be incorporated into later generations.

The term crossover describes the combination of one or more models to create a new model from one generation to the next. It is analogous to reproduction and biological crossover, upon which genetic programming is based. In some embodiments, models can also be modified between generations using a fitness function (e.g., a particular type of objective function that is used to summarize, as a single figure of merit, how close a given design solution is to achieving the set aims) or multiple generations of evolution to resolve a user-defined task (e.g., describing a relationship between predictors and outcomes).

Mutation of a model is the creation of a new models based on a single existing model. Mutated models are contemplated to be models that have been subtly changed or altered from their original form. Mutation can be used to maintain diversity from one generation of a population of models to the next. It is analogous to biological DNA mutation, and involves the alteration of one or more aspects of a model from its initial state.

One example of mutation involves implementing a probability that an arbitrary bit in a model will be changed from its original state. A common method of implementing mutation involves generating a random variable for each bit in a sequence. This random variable tells whether a particular bit will be modified. This mutation procedure, based on the biological point mutation, is called single point mutation. Other types include inversion and floating-point mutation. Other types of mutations include swaps, inversions, and scrambles.

Creating offspring of models is the creation of a new model based on two or more existing models. An offspring of two or more parent models takes features from the parent models and combines them to create a new model. Embodiments of the inventive subject matter use offspring to vary the features of a model from one generation to the next. It is analogous to reproduction and biological crossover, upon which models of the inventive subject matter (e.g., genetic algorithms) are based. Crossover is a process of taking more than one (e.g., two or more) parent models and producing a child model from them.

Using any number or combination of the techniques described above, the second generation of the run, shown in FIG. 6 as the set of models $\{m_{121}, \ldots, m_{12j}\}$, is thus created. In some embodiments, it is contemplated that each subsequent generation includes fewer models than a previous generation (e.g., j<i), but in other embodiments, it is contemplated that each subsequent generation has an equal number of models as the previous generation (e.g., j=i). Similarly, each subsequent generation of models can include more models than a previous generation (e.g., j>i), or each generation can include varying numbers of models (e.g., a second generation can have fewer models than the first, while the third generation can have more models than the second or even more models than the first, and so on).

The process of iterating through generations of models within a run can be completed a desired number of times. In FIG. 6, the number of generations is expressed as the variable a. Preferably, a is sufficiently large to allow the resulting number of models to adequately traverse the dataset. For example, there should be sufficient generations to enable models to consider every possible variable (e.g., predictors) from a dataset. For example, larger datasets may require more generations of models when compared with smaller datasets. In some embodiments, a can be between 10 and 10,000 generations, more preferably between 50 and 1,000 generations, and most preferably between 100 and 500 generations. Generational evolution as described in the inventive subject matter can be categorically described as genetic programming. Because the inventive subject matter enables efficient elimination of model components, it is contemplated that methods of the inventive subject matter can be useful to dramatically improve the computational efficiency any manner of iterative programming.

After iterating through a generations, the final generation of the run in FIG. 6 is reached. A final generation of a run (e.g., generation a in FIG. 6), in some embodiments, is made up of a single model, but it is also contemplated that a final generation of a run can be made up of a set of models. In embodiments where the final generation of a run includes a set of models, the "best" model or models are once again determined based on any of the criteria discussed above with respect to determining which models are the "best" in a generation. It is also contemplated that all the models in the final generation can be considered the "best" models of their run. In embodiments where only a single model exists in the final generation of a run, that model is necessarily considered the "best" model of the generation and therefore the "best" model of the run.

With the "best" model (or models) of a run identified (for example, in FIG. 6, the best model is labeled as m) a model-attribute is calculated for the "best" model.

Because each model in a run is made using model components identified in a model pool, the "best" model or models from a particular run likewise use model components from the same model pool that the first generation of models drew from. For example, FIG. 7 shows a pool of model components having model components that can be used to generate models in the run shown in FIG. 6. Thus, the model components that are used in the "best" model of the run shown in FIG. 6 were necessarily drawn from the pool of model components shown in FIG. 7.

This is important for the step of computing utility metrics for model components. In some embodiments, each model component that is used in a run (e.g., used in any generation of the run) has a utility metric computed for it. In other embodiments, only each model component that is used in a "best" model has a utility metric computed for it. In still further embodiments, utility metrics could be computed for model components found in a subset of models from a run (e.g., only the most recent 10%, 20%, 30%, 40%, 50%, 60%, or 70% of generations).

For example, in FIGS. 6 and 7, if a model component from the pool of model components appears in the "best" model (e.g., $m_{1a1}$) the numerator of that model component's utility metric is 1. If a model component appears multiple times in a single model (or in multiple models that make up a "best" generation), the count only goes up by one for that model (or for that run). For example, if a "best" generation includes two models, and both models include model component $c_g$, the numerator for $c_g$ still only counts up by 1 for that run.

As for the denominator of the utility metric, each time a model component appears in a pool of model components, the denominator increases by one. For example, all model component in the pool of model components of FIG. 7 would have a denominator of 1 for their utility metrics. The denominator of a utility metric can be greater than one when there is more than one pool of model components.

Figure 8:
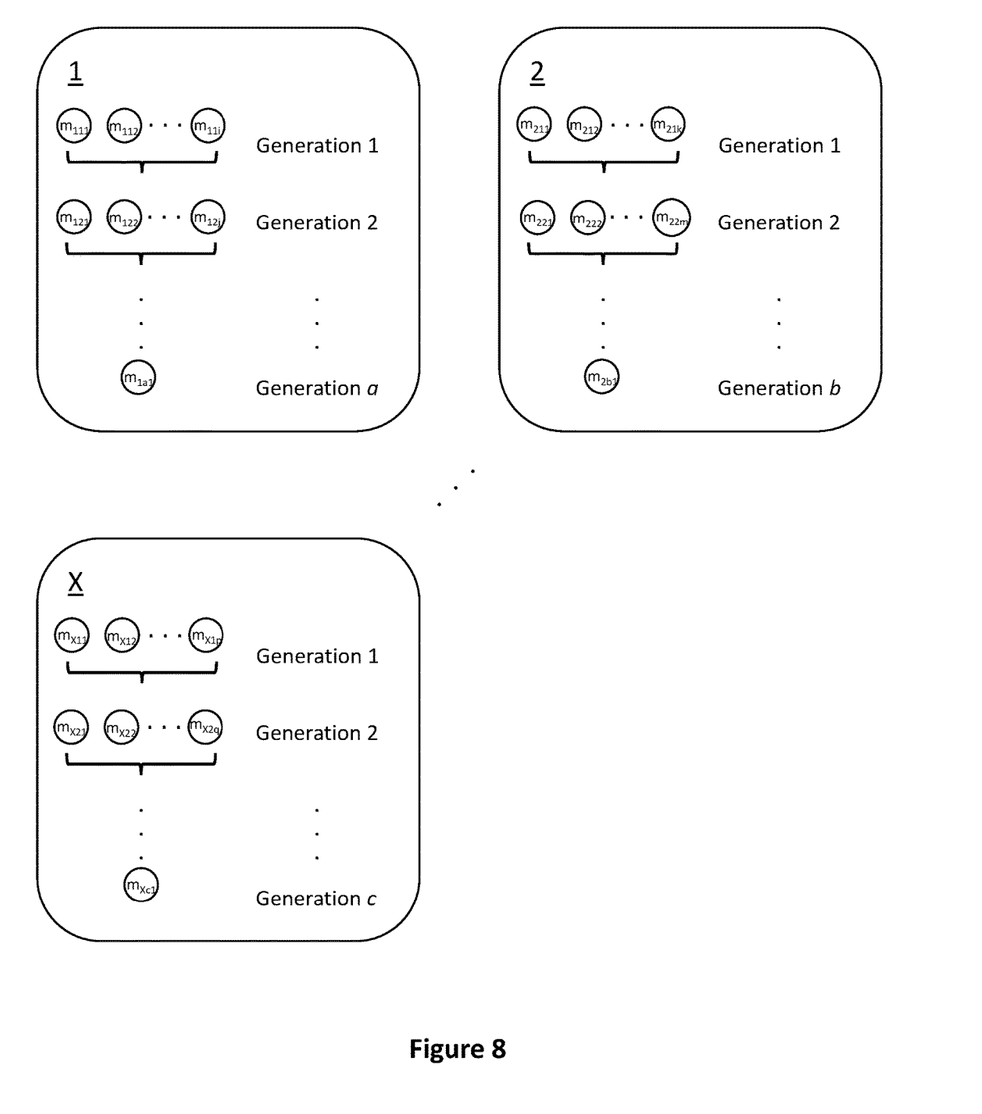
FIG. 8 shows one contemplated embodiment comprising a series of runs, each run having models, a series of generations, and a "best" model.
Figure 9:
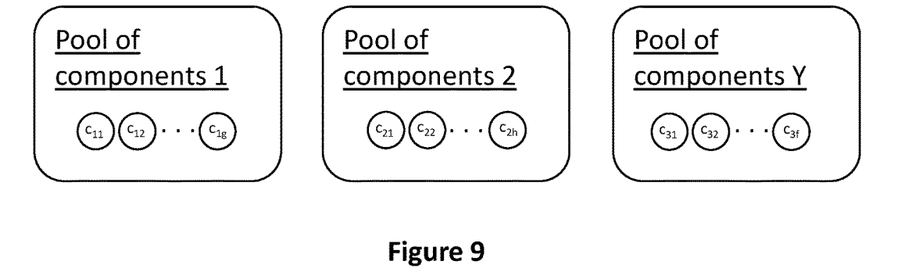
FIG. 9 shows a series of model component pools corresponding to the runs in FIG. 8.

FIGS. 8 and 9 show an embodiment of the inventive subject matter implementing X runs and Y pools of model components. While it is contemplated that there is one pool of model components per run (e.g., X=Y), and each pool of model components specifically corresponds to a particular run, it is similarly contemplated that there can be fewer model component pools than runs (e.g., X>Y), or more model component pools than runs (e.g., X<Y).

When determining utility metrics for model components that appear in runs 1 through X from FIG. 8, the numerator can be between 0 and X (e.g., the total number of runs) and the denominator can be between 1 and Y (e.g., the total number of model component pools). For example, if a model component appears in a "best" model in two runs, but the same model component was present in four model component pools, the utility metric would be 0.5 (2 divided by 4). Utility metrics are calculated for every model component, but if a model component does not appear in any "best" model in any run, that model component would have a numerator of zero and therefore the utility metric would be zero.

It is contemplated that utility metrics can be computed for every model component in all pools of model components. In some embodiments, though, utility metrics are computed only for the model components appearing in the model or models in the "best" generation of a run. Intuitively, if a model component never appears in a "best" model, it's numerator will necessarily be zero. Thus, computing a utility metric for a model component that does not appear in at least one "best" model can be skipped and instead all model components that do not appear in at least one "best" model can be eliminated from all model component pools without using excess processor cycles.

For example, in FIG. 8, there are X runs, where each run has a single best model (i.e., the models in the set $\{m_{1a1}, \ldots, m_{Xc1}\}$ the final generation of each run). Because it is contemplated that the pools of model components shown in FIG. 9 can have overlapping model components, it would be possible for model component $c_{1g}$ to exist in all or some of the other model pools. If model component $c_{1g}$ appears in 5 model component pools (i.e., Y≥5), and $c_{1g}$ similarly appears in 3 of the "best" models of those runs, the utility metric for model component $c_{1g}$ would be 3:5 or 0.6.

For each model that utility metric $c_{1g}$ appears in, a model-attribute metric is needed. To compute a weighted utility metric, the utility metric of $c_{1g}$ is multiplied by some function of the model-attributes of the models in which $c_{1g}$ appears. The model-attributes of the models in which $c_{1g}$ appears can be, for example, averaged. In other embodiments, the median of the model-attributes can be used, in other embodiments the mode can be used, and in still further embodiments it is also contemplated that a geometric mean can be implemented.

It is also contemplated that when there are large numbers of "best" models that a particular model component appears in, outliers can be eliminated prior to computing a mean, median, or mode (e.g., some number of the highest and lowest model-attributes can be ignored before computing an average or determining a median of the model-attributes). In some embodiments, other known mathematical operations or functions can be applied to a set of model-attributes to arrive at a manipulated model-attribute that can be used in calculating a weighted utility metric for a particular model component.

Thus, returning to the example above, if the utility metric for $c_{1g}$ is 0.6 and the average of the model-attribute is 30%, the weighted utility metric would be 0.18. This process is repeated for all model components that appear in the set of "best" models thus creating weighted utility metrics that correspond to each model component in the set of "best" models.

The next phase of methods of inventive subject matter requires determination of which model components are considered important and which are not. A model component that is "important" will be reused and eligible for placement in a set of new model pools that are used to generate a subsequent set of runs. A model component that is "unimportant" is discarded and will not be reused in a new set of model pools, thereby ensuring "unimportant" model components are not used to create new models.

It is contemplated that whether a model component is "important" or "unimportant" is determined by whether or not the weighted utility metric falls below or above a threshold. In some embodiments, the threshold can be calculated by first averaging all of the weighted utility metrics for the model components appearing in the "best" set of models (e.g., $\{m_{1a1}, \ldots, m_{Xc1}\}$ in FIG. 8). Then, each individual weighted utility metric is divided by that average. If the result of dividing a weighted utility metric by the average of all weighted utility metrics is below a certain threshold (e.g., the result is less than 1.2, 1.1, 1, 0.9, 0.8, 0.7, 0.6, 0.5, or 0.4), the model component corresponding to that weighted utility metric is eliminated from consideration (e.g., that model component cannot be put into any new model component pools that are used to generate new sets of runs). This process is shown in FIG. 5.

Other suitable methods of determining whether to keep or eliminate model components are also contemplated. For example, in some embodiments, weighted utility metrics are compared to a threshold value without undergoing any manipulation prior to comparison (e.g., the process of averaging, dividing, and comparing, or any of the other processes discussed above). The threshold value can be arbitrary, or selected based on an understanding of expected weighted utility metric values. In these embodiments, upon computing a weighted utility metric for a model component, that weighted utility metric is then compared to a predefined threshold, and, based on that comparison, the model component corresponding to that weighted utility metric is either eliminated from all model component pools (e.g., the weighted utility metric fell below the threshold value) or allowed to remain for use in future runs.

In some embodiments, model components can be eliminated (e.g., removed from consideration) based on their corresponding utility metrics. To do this, once utility metrics are computed for some number of components, utility metrics for those model components are analyzed using, for example, summary statistics. Contemplated summary statistics include location (e.g., arithmetic mean, median, mode, and interquartile mean), spread (e.g., standard deviation, variance, range, interquartile range, absolute deviation, mean absolute difference and the distance standard deviation), shape (e.g., skewness or kurtosis, and alternatives based on L-moments), and dependence (e.g., a Pearson product-moment correlation coefficient or a Spearman's rank correlation coefficient).

Figure 11:
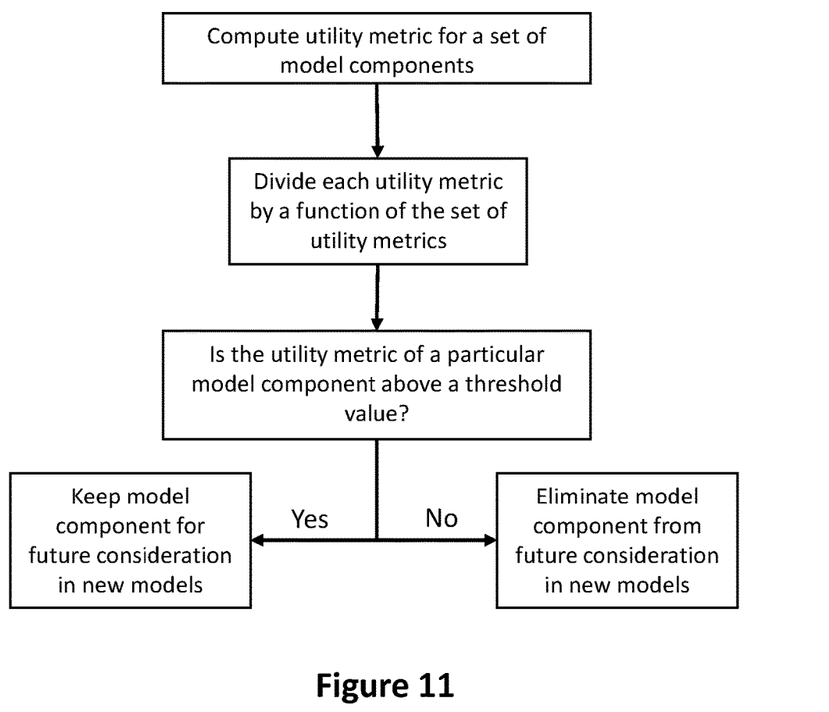
FIG. 11 shows another contemplated method for eliminating or retaining a given model component from a pool of model components.

Utility metrics can then be compared to a summary statistic to determine whether it should be kept or eliminated. For example, if a utility metric for a model component is compared to an arithmetic mean calculated from a set of utility metrics (e.g., the utility metric is divided by the average of a set of utility metrics), then that model component can be eliminated if its utility metric is less than one (indicating that model component is less impactful or useful than half of the total model components whose utility metrics contribute to the mean). In another example, if a utility metric falls below one standard deviation from the mean, then the model component corresponding to that utility metric can be eliminated. The overarching goal is to facilitate elimination of model components that, when compared to other model components, do not contribute as much to "best" models as other model components. FIG. 11 demonstrates this concept generally, where the threshold value is determined used a summary statistic as described above.

It is contemplated that in many situations, utility metrics are compared to summary statistics by dividing an individual utility metric by a summary statistic of a set of utility metrics. While this works for some summary statistics (e.g., location summary statistics), other summary statistics require a comparison of a utility metric value to a range of values to see if the utility metric falls within a desired range (e.g., spread summary statistics).

It is also contemplated that, instead of computing an average of weighted utility metrics, the weighted utility metrics for each model component in the set of "best" models can be manipulated in other ways. For example, in some embodiments, each individual weighted utility metric can be divided by the median of the set of weighted utility metrics. In other embodiments, the mode of the set of weighted utility metrics can be used instead of the mean or median.

Ultimately, it is contemplated that some number of model components are found to be less useful than others based on their corresponding weighted utility metrics, and when that lack of utility falls below a threshold, those model components are discarded.

In some embodiments, after eliminating model components from consideration, new pools of model components are generated without the eliminated model components. In other embodiments, model components are eliminated from the existing model pools, and those same model pools are again used to generate sets of models for a new set of runs. In still further embodiments, model components are merely taking out of consideration without eliminating them from model component pools. From this point forward, the process can repeat, ultimately resulting in eliminating more model components. The process can be repeated as needed until the remaining model components are all found to contribute meaningfully to the "best" models in each run.

It is also contemplated that, when generating subsequent runs using the model component pools that have been subject to model component trimming, the set of "best" models from the previous runs can be incorporated into the subsequent runs. If a "best" model from a previous run includes a model component that would otherwise be discarded for determined unimportance, that model component can thereby be reintroduced by introduction of the "best" model from that pervious run.

For example, a first run results in a "best" model and a second run (which begins with a set of randomly generated models that use model components from a pruned model component pool) can then include the first run's "best" model in its initial set of randomly generated models. Doing this can introduce elements of previously identified effective models into new runs (e.g., it can revive one or more model components that would otherwise have been discarded), thereby improving the second run's ability to generationally evolve a "best" model.

Through this process, model components are pruned from one or more pools of model components. By pruning model components according to the inventive subject matter, computation time required to perform genetic programming (and related tasks) is dramatically reduced.

Figure 10:
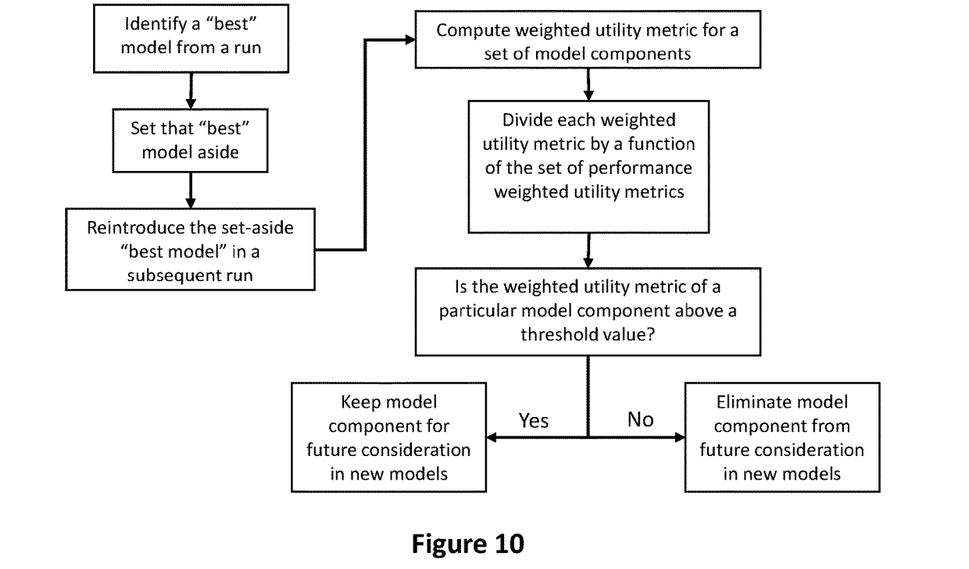
FIG. 10 shows a contemplated method for eliminating or retaining a given model component from a pool of model components.

The inventors contemplate that model components from the "best" models from previous runs can additionally be reincorporated. Model components that have been eliminated through the above-mentioned process can be brought back into consideration. The "best" models from past runs (e.g., one or more models form each run that has been found to be the "best") could include model components that were eliminated for failure to meet a threshold value to remain in consideration. These "best" models could be considered in subsequent runs (as discussed above), thereby bringing otherwise-eliminated model components back into consideration. Put into the context of the Figures, for example, it is contemplated that, as shown in FIG. 8, models in the any generation (e.g., the final generation) of Run 2 could incorporate "best" model ($m_{1a1}$) from Run 1, thereby reintroducing any model components in the model $m_{1a1}$ that otherwise may have been eliminated from consideration. This process is illustrated in FIG. 10.

In embodiments where model components are brought back into consideration in this manner, it is contemplated that instead of eliminating a model component from one or more pools of model components when that model component does not meet a threshold value, that model component is instead simply taken out of consideration (e.g., it is allowed to stay in all model component pools, but it is no longer allowed to be used in any models). That way, when a "best" model from one run is reintroduced in a subsequent run, the denominator of the utility metric will be non-zero, and that model component has a chance to come back into consideration. For example, if a model component was initially eliminated from consideration, but it is reintroduced and subsequently its weighted utility metric rises above a threshold value, that model component can be brought back into consideration and used in later-generated models.

The inventive subject matter is an improvement in the state of the art in part because computational methods of handling large datasets are subject to the "curse of dimensionality." The curse of dimensionality is the idea that, as the number of rows (e.g., observations) and/or columns (e.g., predictors) increases, the dimensionality of a problem increases. When dimensionality increases, the volume of the space increases so fast that the available data become sparse. This sparsity is problematic for any method that requires statistical significance. This sparsity becomes problematic for any analytical method in a few important ways:

First, if a statistically sound and reliable result is desired, the amount of data needed to support the result often grows exponentially with dimensionality. Second, many methods for organizing and searching data often rely on detecting areas where objects form groups with similar properties. But with high dimensional data, it is possible for all objects appear to be sparse and dissimilar in many ways, dampening efficiency of common data organization strategies.

In the context of iterative modeling techniques, hi-dimensionality poses additional problems. Each added dimension increases the size of the solution search space exponentially. Because many iterative methods randomly sample a search space for possible solutions, the addition of each model component to a problem exponentially increases the amount of time (both physical and computational) needed to converge on a solution.

In applying the inventive subject matter, the inventors have observed that iteratively reducing the number of input features (e.g., model components) available to a iterative modeling process can either decrease the time needed to reach convergence by, in some situations, 100×, or in the alternative can substantially increase the "search space" or depth that the process can consider in the same amount of time.

One reason for this performance increase is that decreasing model components available in an iterative modeling process increases the likelihood that any individual model component will be stored in—and subsequently called—CPU cache (called a "cache hit"), as opposed to being called from RAM or another form of electronic storage (e.g., a hard drive—flash or otherwise), which is referred to as a "cache miss." The inventive subject matter increases the chance of "cache hits," and in some instances even makes the chance of a "cache hit" more likely for any given model component than a "cache miss."

As mentioned briefly above, a "cache hit" is a state in which data requested (e.g., a model component) for processing by program is found in a CPU's cache memory. Cache memory is significantly faster at delivering data to the processor. When executing a command, CPUs look for the data in its nearest accessible memory location, which is usually the primary CPU cache. If the requested data is found in the cache, it is considered a "cache hit." A "cache hit" serves data more quickly by virtue of a CPU cache's speed in delivering data to a CPU. A "cache hit" can also refer to pulling data from a disk cache where the requested data is stored and accessed at first query.

Improvements in computation time when maximizing "cache hits" stem from the speed of accessing data stored in CPU cache compared to other storage mediums. For example, a Level 1 cache reference takes on the order of 0.5 nanoseconds and a Level 2 cache reference takes on the order of 7 nanoseconds. By comparison a random read from a solid state hard drive takes on the order of 150,000 nanoseconds-300,000 times slower than the Level 1 cache reference.

Thus, specific compositions and methods of iterative feature selection have been disclosed. It should be apparent, however, to those skilled in the art that many more modifications besides those already described are possible without departing from the inventive concepts in this application. The inventive subject matter, therefore, is not to be restricted except in the spirit of the disclosure. Moreover, in interpreting the disclosure all terms should be interpreted in the broadest possible manner consistent with the context. In particular the terms "comprises" and "comprising" should be interpreted as referring to the elements, components, or steps in a non-exclusive manner, indicating that the referenced elements, components, or steps can be present, or utilized, or combined with other elements, components, or steps that are not expressly referenced.

What is claimed is:

1. A computing system for increasing cache hits when running iterative model development programs, comprising:
   a processor;
   a cache memory;
   a second memory, wherein the second memory comprises executable instructions for performing the following steps using the processor:
   (a) generating a first model, wherein the first model comprises a first model component from a first pool of model components;
   (b) generating a second model, wherein the second model comprises a second model component from a second pool of model components;
   (c) performing an iterative model development process to generate an improved set of models using the first and second models;
   (d) computing a first utility metric of the first model component comprising a ratio of (1) a quantity of models in which the first model component is present in the improved set of models, to (2) a quantity of model component pools in which the first model component is present;
   (e) computing a second utility metric of the second model component comprising a ratio of (1) a quantity of models in which the second model component is present in the improved set of models, to (2) a quantity of model component pools in which the second model component is present; and
   (f) eliminating, based on the first and second utility metrics, the first and second model components from the first and second pools of model components, thereby increasing the likelihood of the processor accessing the cache memory when executing step (c).

2. The computing system of claim 1, wherein the first model component is randomly selected from the first pool of model components for use in the first model.

3. The computing system of claim 1, wherein the first and second pools of model components comprise at least one of: a computational operator, a mathematical operator, a constant, a predictor, a feature, a variable, a ternary operator, an algorithm, a formula, a binary operator, a hidden node, a weight, a bias, a gradient, a hyper-parameter.

4. The computing system of claim 1, wherein the steps of generating a first and second model comprises an iterative modeling process.

5. The computing system of claim 4, wherein the iterative modeling process comprises at least one of: an evolutionary computing process, a genetic programming process, a genetic algorithm process, a neural network process, a deep learning process, a Markov modeling process, a Monte Carlo modeling process, and a stepwise regression process.

6. The computing system of claim 1, further comprising the step of retaining, based on the first and second utility metrics, the first and second model components from the first and second pools of model components.

7. The computing system of claim 1, wherein the second memory further comprises instructions for performing the steps of:
   eliminating, based on the first and second utility metrics, the first and second model components from the first and second pools of model components to generate a third pool of model components;
   generating a third model, wherein the third model comprises a third model component from the third pool of model components;
   computing a third utility metric of the third model component comprising a ratio of (1) a quantity of models in which the third model component is present, to (2) a quantity of model component pools in which the third model component is present; and
   eliminating, based on the third utility metric, the third model component from the third pool of model components.

8. A computing system for increasing cache hits when running iterative model development programs, comprising:
   a processor;
   a cache memory;
   a second memory, comprising instructions for performing the following steps:
   (a) generating a first model, wherein the first model comprises a first model component from a first pool of model components;
   (b) generating a second model, wherein the second model comprises a second model component from a second pool of model components;
   (c) performing an iterative model development process to generate a set of improved models, comprising an improved first model from the first model and an improved second model from the second model;

(d) computing (1) a first model-attribute metric corresponding to the improved first model and (2) a second model-attribute metric corresponding to the improved second model;

(e) computing a first utility metric of the first model component comprising a ratio of (1) a quantity of models in which the first model component is present in the set of improved models, to (2) a quantity of model component pools in which the first model component is present;

(f) computing a second utility metric of the second model component comprising a ratio of (1) a quantity of models in which the second model component is present in the set of improved models, to (2) a quantity of model component pools in which the second model component is present;

(g) computing a first weighted utility metric that corresponds to the first model component, the first weighted utility metric comprising an outcome of a first function that incorporates: (1) model-attribute metrics for models in which the first model component is present and (2) the first utility metric;

(h) computing a second weighted utility metric that corresponds to the second model component, the weighted utility metric comprising an outcome of a second function comprising: (1) model-attribute metrics for models in which the second model component is present and (2) the second utility metric; and (i) eliminating, based on the first and second weighted utility metrics, the first and second model components from the first and second pools of model components, thereby increasing the likelihood of the processor accessing the cache memory when executing step (c).

9. The computing system of claim 8, wherein the model-attribute metric comprises at least one of accuracy, sensitivity, specificity, area under curve (AUC) from a receiver operating characteristic (ROC) metric, and algorithm length.

10. The computing system of claim 8, wherein the second memory further comprises instructions for repeating the step of performing an iterative model development process after performing step (i).

11. The computing system of claim 10, wherein the iterative model development process comprises at least one of: an evolutionary computing process, a genetic programming process, a genetic algorithm process, a neural network process, a deep learning process, a Markov modeling process, a Monte Carlo modeling process, and a stepwise regression process.

12. A computing system for increasing cache hits when running iterative model development programs, comprising:
a processor;
a cache memory;
a second memory, comprising a dataset including predictors, and further comprising instructions for performing the following steps:
(a) generating a model comprising a model component;
(b) performing an iterative model development process to generate a set of improved models, including a first improved model based on the model;
(c) computing, using a subset of the dataset, a model-attribute metric corresponding to the model;
(d) computing a utility metric of the model component comprising a ratio, wherein a numerator of the ratio comprises a quantity of models in which the model component is present in the set of improved models;
(e) wherein a denominator of the ratio is incremented when the model component is present in a pool of model components;
(f) computing a weighted utility metric that corresponds to the model component, the weighted utility metric comprising an outcome of a function that incorporates: (1) the model-attribute metric and (2) the utility metric; and
(g) eliminating, based on the weighted utility metric, the model component from the pool of model components, thereby increasing the likelihood of the processor accessing the cache memory when executing step (b).

13. The computing system of claim 12, wherein the second memory further comprises instructions for retaining the model component from the pool of model components based on the weighted utility metric.

14. The computing system of claim 12, wherein the model component is randomly generated.

15. The computing system of claim 12, wherein the model component comprises at least one of a computational operator, a mathematical operator, a constant, a predictor, a feature, a variable, a ternary operator, an algorithm, a formula, a binary operator, a hidden node, a weight, a bias, a gradient, a hyper-parameter.

16. The computing system of claim 12, wherein the pool of model components comprises at least one of: a computational operator, a mathematical operator, a constant, a predictor, a feature, a variable, a ternary operator, an algorithm, a formula, and a binary operator.

17. The computing system of claim 12, wherein the function comprises a product of at least the model-attribute and the utility metric.

18. The computing system of claim 12, wherein the model-attribute comprises at least one of accuracy, sensitivity, specificity, area under curve (AUC) from a receiver operating characteristic (ROC) metric, and algorithm length.

* * * * *